United States Patent [19]
Johnson et al.

[11] Patent Number: 5,939,362
[45] Date of Patent: Aug. 17, 1999

[54] ENHANCED CORROSION PROTECTION BY USE OF FRICTION REDUCERS IN CONJUCTION WITH CORROSION INHIBITORS

[75] Inventors: John D. Johnson, Needville; Shi-Liang Fu; Matthew J. Bluth, both of Richmond; Robert A Marble, Sugar Land, all of Tex.

[73] Assignee: Nalco/Exxon Energy Chemicals, L.P., Sugar Land, Tex.

[21] Appl. No.: 08/958,799

[22] Filed: Oct. 27, 1997

Related U.S. Application Data

[63] Continuation-in-part of application No. 08/411,185, Mar. 27, 1995, abandoned.

[51] Int. Cl.$^6$ .................................................. C09K 3/00
[52] U.S. Cl. ........................... 507/939; 252/390; 585/10; 585/950
[58] Field of Search .................................. 507/118, 120, 507/90, 939

[56] References Cited

U.S. PATENT DOCUMENTS

| | | | |
|---|---|---|---|
| H751 | 3/1990 | Sullivan et al. | 252/8.553 |
| 2,930,755 | 3/1960 | Crittendon et al. | 507/129 |
| 3,002,960 | 10/1961 | Kolodny | 526/211 |
| 3,023,760 | 3/1962 | Dever et al. | 137/13 |
| 3,087,543 | 4/1963 | Arendt | 166/295 |
| 3,102,548 | 9/1963 | Smith et al. | 137/13 |
| 3,105,047 | 9/1963 | Miller et al. | 507/224 |
| 3,254,719 | 6/1966 | Root | 166/308 |
| 3,283,812 | 11/1966 | Ahearn et al. | 166/275 |
| 3,284,393 | 11/1966 | Vanderhoff et al. | 524/801 |
| 3,308,885 | 3/1967 | Sandiford | 166/295 |
| 3,370,647 | 2/1968 | Hamm | 165/97 |
| 3,376,924 | 4/1968 | Felsenthal et al. | 166/401 |
| 3,399,725 | 9/1968 | Pye | 166/275 |
| 3,542,044 | 11/1970 | Hansen et al. | 137/13 |
| 3,654,993 | 4/1972 | Smith et al. | 166/279 |
| 3,830,302 | 8/1974 | Dreher et al. | 166/294 |
| 4,152,274 | 5/1979 | Phillips et al. | 507/222 |
| 4,197,091 | 4/1980 | Gainer | 252/390 |
| 4,238,350 | 12/1980 | Larsen et al. | 252/392 |
| 4,339,349 | 7/1982 | Martin et al. | 252/389 A |
| 4,436,639 | 3/1984 | Oppenlaender et al. | 252/8.55 E |
| 4,517,114 | 5/1985 | Oppenlaender et al. | 252/389 R |
| 4,526,693 | 7/1985 | Son et al. | 252/8.5 B |
| 4,842,073 | 6/1989 | Himes et al. | 166/294 |
| 4,964,468 | 10/1990 | Adams et al. | 166/310 |
| 4,974,678 | 12/1990 | Himes et al. | 166/308 |
| 4,977,962 | 12/1990 | Himes et al. | 166/305.1 |
| 5,000,873 | 3/1991 | Fisk et al. | 252/391 |
| 5,027,901 | 7/1991 | French et al. | 166/310 |
| 5,097,904 | 3/1992 | Himes | 166/294 |
| 5,120,471 | 6/1992 | Jasinski et al. | 252/389.54 |
| 5,208,216 | 5/1993 | Williamson et al. | 507/120 |
| 5,300,235 | 4/1994 | Clewlow et al. | 252/394 |
| 5,322,640 | 6/1994 | Byrne et al. | 252/389.22 |
| 5,380,706 | 1/1995 | Himes et al. | 507/129 |

FOREIGN PATENT DOCUMENTS

| | | |
|---|---|---|
| 552035 | 1/1958 | Canada . |
| 628235 | 9/1961 | Canada . |
| 526 251 A1 | 12/1993 | European Pat. Off. . |
| 2846977 | 5/1979 | Germany . |

OTHER PUBLICATIONS

Corrosion Study in Dynamic High Velocity Flow Application Based on New Flow Loop Data, Paper No. 117, NACE, Corrosion 93, Shi–Liang Fu/J. Byron Strickland pp. 1–16. (1993).

*Primary Examiner*—Ellen M. McAvoy
*Attorney, Agent, or Firm*—Michael B. Martin; Thomas M. Breininger

[57] ABSTRACT

A method of inhibiting corrosion of iron and steel alloys in contact with oil-in-brine emulsions is claimed. The method comprises treating the oil-in-brine emulsions with an effective amount of a water soluble polymer having an average molecular weight of at least one million and an effective amount of a nitrogen-containing corrosion inhibitor.

5 Claims, No Drawings

ENHANCED CORROSION PROTECTION BY USE OF FRICTION REDUCERS IN CONJUCTION WITH CORROSION INHIBITORS

This invention is a continuation-in-part of U.S. patent application Ser. No. 08/411,185 entitled "Enhanced Corrosion Protection By Use of Friction Reducers" filed on Mar. 27, 1995, now abandoned, the disclosure of which is hereby incorporated by reference.

FIELD OF THE INVENTION

This invention relates to the prevention of corrosion in pipelines used for the transport of petroleum fluids.

BACKGROUND OF THE INVENTION

Pipelines are commonly used for the transport of petroleum products, with steels as the most commonly used tubular materials for transport purposes. The pipe employed may range from four inches to over forty-eight inches in diameter, and have a minimum yield strength rating of 40,000 psi. Transported fluids may flow at velocities from 3 ft/sec to over 60 ft/sec, and may cause pressures on the pipeline to be from atmospheric pressure to over 1,500 psi. These physical demands will have an effect on the constitution of the pipeline. Moreover, the presence of water and corrosive impurities in the petroleum products such as hydrogen sulfide, carbon dioxide and organic acids, leads to corrosion of the pipeline. The problem is particularly severe when the pipelines are used to transport fluids at high flow velocities.

In the oilfield, brine, oil and gas make up the petroleum products which may travel through the pipe in separate phases or in a stable emulsion. Both conditions will be represented by the term oil-in-brine emulsion hereafter. Corrosion increases sharply as the salt content of the brine in the oil-in-brine emulsion increases to about 15% total dissolved solids. Low pH brines tend to be more corrosive. Additional factors contributing to corrosion within the pipelines concern the makeup of the transported oil, which itself may contain organic acids, paraffins, asphaltenes and aromatics. The gravity of the crude, the amount of acid gases, the salt content and composition all have an effect on corrosivity. Further, as temperature and pressure increase, they result in an increase in corrosion rate.

In order to protect the pipelines from this corrosive environment, it is now common to treat the fluids transported by these pipelines with small quantities of corrosion inhibitors. Nitrogen-containing water-soluble molecules such as imidazoline salts as disclosed in DE 2846977 and polymerized fatty acids disclosed in U.S. Pat. No. 4,197,091 are among the compounds which have been successfully employed as corrosion inhibitiors. Other classes of corrosion inhibitors commonly used in petroleum production include amides, amines, quaternary ammonium salts, nitrogen-containing heterocycles, and sulfur-containing compounds. Though several classes of corrosion inhibitors are known, it would be of great benefit to the art to increase the activity of corrosion inhibition additives.

Another factor which affects the transport of petroleum products, is friction produced by turbulent flow as the petroleum products travel through the pipeline at high velocities. For example, in Prudhoe Bay, Ak., the produced fluids travel inside 24 inch (61 cm) diameter multiphase pipelines from approximately 25 ft/sec to 50+ ft/sec depending upon production. The turbulence produced as the solutions are pumped through the pipe under pressure results in the production of friction. As a remedy, friction reducing agents such as polymeric materials can be added to the stream to prevent consequent energy loss in the flow of the fluid as it travels throught the pipeline. A good friction reducer will cause a large decrease in friction at small concentrations, will be inexpensive, and will have high shear, temperature and pressure stability.

Water-soluble polymers such as polyacrylamide are known for reducing pipeline friction as disclosed in U.S. Pat. No. 3,254,719, the specification of which is hereinafter incorporated by reference. Polyacrylamide has also been combined with dispersing agents, as disclosed in U.S. Pat. No. 3,542,044 and with other co-polymers as disclosed in U.S. Pat. No. 4,152,274. Generally, the polymers are injected continuously into the pipeline.

French et al., U.S. Pat. No. 5,027,901, discloses a method of inhibiting corrosion in an oil well comprises introducing into the well a pourable emulsion comprising 5–50% of a continuous oil phase containing a corrosion inhibiting compound. This technique was specifically designed for the unique problems presented by a vertical pumping action, and thus does not address the problems associated with the horizontal flow across a pipeline improved by the method disclosed herein. Moreover, the polymers of this invention are not taught by this reference.

Smith et al., U.S. Pat. No. 3,102,548 describes a process wherein polyacrylamide is added to an aqueous fluid which is pumped under turbulent flow conditions. There is no teaching or suggestion that a polymer which enhances the flow of aqueous fluids will also be effective to enhance anti-corrosive capabilities of corrosion inhibitors in oil-in-brine emulsions of crude oil. Moreover, a treatment agent which enhances fluid flow would ordinarily be thought to increase corrosion, not decrease it.

Martin et al., U.S. Pat. No. 4,339,349 discloses compositions useful as corrosion inhibitors. Methods for the enhancement of these activities in pipelines are not described therein.

Acrylamide polymers, as the term is used herein, includes polymers consisting entirely of acrylamide units, which may be partially hydrolyzed to acrylic acid units. The term acrylic acid units encompasses the various salts such as the sodium or potassium salt form of the acrylic acid. This hydrolysis of amide groups to carboxylic acid groups may be conducted using alkaline materials such as sodium hydroxide, ammonium hydroxide, soda ash, potassium hydroxide, or quaternary ammonium hydroxide. Optimum partial hydrolysis of polyacrylamide for operation as a friction loss reducer is described in U.S. Pat. No. 3,254,719 as 20 to 40 percent hydrolysis of available amide groups.

Polyacrylamide may be synthesized as one of three forms: solid, solution or emulsion. Dry polymer may be obtained by solution polymerization with a high concentration of monomer. The resultant gel can be ground and dried to obtain polyacrylamide in a powdered form. Solution polymerization with up to 15% monomer results in an aqueous solution of polyacrylamide. Lastly, polyacrylamide can be made in the form of an aqueous water-in-oil emulsion. The emulsion is formed by utilizing a water-in-oil emulsifying agent. To this monomer is added a free radical-type polymerization catalyst and then heat is applied under free radical-forming conditions to form water-soluble polymer lattices. The polymer lattices may be unstable, and therefore must be treated with additional emulsifiers. The preparation of these emulsions is described in U.S. Pat. No. 3,284,393. Subsequently, the emulsions may be inverted to produce aqueous solutions.

Another class of water-soluble polymers useful in this invention are water-soluble cationic polymers dispersed in aqueous solutions of inorganic salts. The inorganic salt may be a sulfate, a chloride or a phosphate, but is preferably ammonium sulfate. Cationic monomers such as dimethylaminoethyl acrylate, dimethylaminoethyl methyacrylate methyl chloride quaternary salt and dimethylaminoethyl methacrylate benzyl chloride quaternary salt may be used to form dispersed homopolymers. Alternatively the cationic monomers described above can be co-polymerized with acrylamide, or ter-polymers may be formed by combinations of cationic monomers with acrylamide.

It is therefore an object of the invention to provide the art a superior method for enhancing the effect of corrosion inhibitors in pipelines transporting oil-in-brine emulsions.

SUMMARY OF THE INVENTION

We have found that water soluble co-polymers, especially co-polymers of acrylamide and acrylic acid, can enhance the activity of corrosion inhibitors in brine solutions by decreasing turbulence such that the corrosion inhibitor can more thoroughly contact the internal surface of the pipeline. Therefore, the friction flow reducing agent acts synergistically with corrosion inhibitors to increase their efficiencies. The result is that the inhibitors can be injected into the pipeline at much lower concentrations, which is both an economical and environmental advantage.

The Invention

The basic method of the invention is to prevent corrosion of the metallic surfaces of a pipeline in contact with an oil-in-brine emulsion of produced fluids being transported under turbulent flow conditions which produce friction comprising adding to the oil-in-brine emulsion flowing through the pipeline an effective friction-reducing amount of a water-soluble polymer having an average molecular weight greater than one million and an effective corrosion-inhibiting amount of a nitrogen-containing corrosion inhibitor.

The present invention relates to reduction of corrosion by concomitant reduction in turbulent flow in a pipeline for the transport of oil-in-brine emulsions. Suitable friction-reducing polymers may include, but are not limited to: water soluble anionic, non-ionic, and cationic polymers.

The anionic treatment polymers useful in the practicing of this invention may be homopolymers of acrylic acid, methacrylic acid or maleic anhydride and copolymers containing acrylic acid, or methacrylic acid, which copolymers also contain at least one of the monomers chosen from the group consisting of acrylamide, methacrylamide, maleic anhydride, hydroxypropylacrylates, hydroxyethylacrylates, N-tertiary butyl acrylamide, 2-acrylamido-2-methylpropane sulfonate, sulfomethyl acrylamide, sulfomethyl methacrylamide, sulfoethylacrylamide, sulfonated styrene, vinyl sulfonate, itaconic acid, or N-hydroxypropylacrylamide. Useful dispersion polymers may be obtained commercially from the Hymo Corporation, Japan. Cationic water-soluble polymers may be synthesized from monomers of methacrylate, acrylate or methacrylamide quaternary salts, or diallyldimethylammonium chloride as homopolymers or as co-polymers with acrylamide. Non-ionic water soluble polymers may be homopolymers of acrylamide or co-polymers of acrylamide and other suitable monomers. Water soluble co-polymers of acrylamide and acrylic acid with from 5 to 95% by weight acrylamide are presently preferred.

One aspect of the invention is to use a water-soluble co-polymer with a molecular weight from 100,000, where the upper limit of the molecular weight will be limited only by the solubility of the polymer in solution. Further, the water soluble co-polymer will have a molecular weight of at least one million. Preferentially, the water-soluble polymer will have a molecular weight of at least five million. The polymer may be added to the oil-in-brine emulsion continuously in an amount of from 25 to 2500 ppm based on the oil-in-brine emulsion. Alternatively, the polymer may also be added to the oil-in-brine emulsion continuously in an amount of from 50 to 1000 ppm based on the oil-in-brine emulsion. Preferentially, the polymer is added continously to the oil-in-brine emulsion in an amount of from 100 to 300 ppm based on the oil-in-brine emulsion.

The water-soluble polymer can be in powdered form, in the form of a dispersion, or in the form of a solution.

Corrosion inhibitors are enhanced by injection of friction flow reducers into the pipeline, though other oilfield pipeline additives may also have enhanced activity when used in conjunction with friction flow reducers. These other additives include: emulsion breakers, antifoams, scale inhibitors, $H_2S$ and $O_2$ scavengers, biocides and paraffin/asphaltene inhibitors. Preferentially, the corrosion inhibitor is a quaternary ammonium salt, alky-substituted heterocycle, amide or an imidazoline.

A corrosion inhibitor useful in this invention is an amide of the following structure:

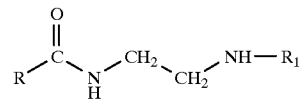

where R is a moiety containing eight to twenty carbon atoms selected from the group consisting of saturated and unsaturated alkyls and $R_1$ is an alkyl polyamine carboxylic acid salt moiety having one to twenty carbon atoms.

Another corrosion inhibitor useful in this invention is a quaternary ammonium salt of the following structure:

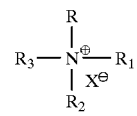

wherein $R_1$, $R_2$, and $R_3$ are moieties containing one to twenty-two carbon atoms and $R_1$ is a moiety containing one to twenty-two carbon atoms and is an alkyl, aryl or alkylaryl group and X is an anion selected from the group consisting of chlorine, bromine and iodine.

A third type of corrosion inhibitor useful in this invention is an alkyl substituted heteroaromatic of the following structure:

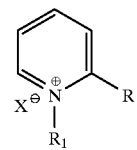

wherein R is an alkyl moiety containing one to twenty-two carbon atoms and $R_1$ is a moiety containing one to twenty-two carbon atoms and is an alkyl or alkylaryl group and X is an anion selected from the group consisting of chlorine, bromine and iodine.

A fourth type of corrosion inhibitor useful in this invention is an imidazoline of the following structure:

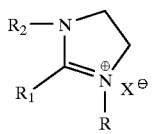

wherein R is a moiety selected from the group consisting of benzyl, methyl, and carboxylic acid salts, $R_1$ is an alkyl moiety containing one to twenty-two carbon atoms and $R_2$ is a moiety selected from the group consisting of alkyl polyamines having one to twenty-two carbon atoms, hydrogen and alcohols having one to twenty carbon atoms and X is an anion selected from the group consisting of chlorine, bromine, iodine and methyl sulfate. The imidazoline is oil-soluble, and it is believed that upon exposure to water, it hydrolyzes to some extent to an amide.

In one aspect of the invention, the chosen corrosion inhibitor is injected continuously into the pipeline in an amount of from 25 to 2500 ppm. Moreover, the chosen corrosion inhibitor may also be injected continuously into the pipeline in an amount of from 50–1000 ppm. Preferentially, the chosen corrosion inhibitor is injected continously into the pipeline in an amount of from 100 to 200 ppm.

EXPERIMENTS

Testing System

The polymer and corrosion inhibitor combination of the invention was tested in a recirculating flow loop system. This device is described in the literature in some detail in an article by Shi-Lang Fu and J. Byron Strickland entitled "Corrosion Study in Dynamic High Velocity Flow Application Based on New Flow Loop Data," Corrosion/93, paper No. 117, NACE, Houston, Tex. (1993).

Briefly, the device comprises three 1 inch O.D. stainless steel lines, an autoclave as a fluid reservoir, a high horsepower centrifugal pump and many process regulating devices. Sampling is effected by carbon steel coupons mounted on specimen holders placed vertically in the center of the flow stream, mounted at different locations within the pipe such that test fluids flow through the annular space between the coupons and the pipe inner wall.

The test fluid is a mixture which consists of 5% NaCl solution and kerosene in a 80/20 ratio, to simulate oilfield conditions. Oxygen was expelled from the flow loop and as well as from the synthetic brine solution (through $CO_2$ sparging) prior to each test. Test fluids were pre-heated to an operating temperature of 74° C., and an operating pressure of 35 psi was utilized. A pre-determined amount of the polymer and corrosion inhibitor combination was injected into the flow loop. This amount was calculated based on the total fluid volume to give the same concentration as would be used in the field. Since the flow loop is a closed system, the concentration of inhibitors in the fluid remains unchanged. This is equivalent to a continuous injection of inhibitor into the pipeline.

The test consisted of treating the test fluids with the test inhibitor/polymer combination and recirculating the resulting solution under pressure through the flow loop system for several hours at the operating temperature. Three different velocities were used for tesing each polymer and/or water-soluble corrosion inhibitor. Following each test, the coupons were removed and the corrosion products were scraped from the surface. The corrosion rate was determined from the measured weight loss of the test coupons.

Example 1

Samples of various water-soluble polymers were evaluated in the flow loop system described earlier with results as reported in Table I. Each polymer was tested at a dosage of 150 ppm. A lower corrosion rate number indicates that some inhibition of the corrosion process has occured. As illustrated by Table I, the anionic latex demonstrated the greatest corrosion inhibition, but the cationic and dispersion polymers also reduced corrosion to a certain extent. These results can be compared to data from two blank reactions, illustrated by rows one and two. There, much higher corrosion rates were evident than when the various polymers were added.

TABLE I

| | | Corrosion Rates (mpy) | | |
|---|---|---|---|---|
| Polymer | Polymer Family | Velocity I 8.0–8.3 ft/sec | Velocity II 1.8–12.0 ft/sec | Velocity III 15.7–15.8 ft/sec |
| none | none | 735 | 867 | 784 |
| none | none | 925 | 963 | 959 |
| Acrylamide/Acrylic Acid co-polymer (70/30[2]) | Anionic Latex[1] | 236 | 265 | 249 |
| A[3] | Cationic Latex[1] | 659 | 727 | 638 |
| B[4] | Dispersion Polymer | 623 | 726 | 620 |

[1]latex refers to an oil-in-water emulsion
[2]mole weight ratio
[3]A = dimethylaminoethyl acrylate benzyl sulfate quaternary salt/acrylamide copolymer (54/46 mole ratio)
[4]B = dimethylaminoethyl benzyl chloride quaternary salt/dimethylaminoethyl methyl chloride quaternary salt/acrylamide terpolymer (25/10/65 mole ratio)

Example 2

The 70/30 mole weight ratio acrylamide/acrylic acid copolymer was tested in the presence of various corrosion inhibitors using the flow loop system described above, with results as reported in Table II. In each case, there is a much greater amount of inhibition when the water soluble polymer is added in conjunction with a corrosion inhibitor than with the corrosion inhibitor alone. The synergy of the use of the corrosion inhibitor in conjunction with a friction flow reducer is evident at each of the three tested velocities. Row seven illustrates a blank experiment in which neither corrosion inhibitor nor water soluble polymer were added, to establish initial rates of corrosion. Those values were in the range of 700–800 mpy. For comparison purposes, corrosion reduction by water soluble co-polymer alone is listed in row eight. Dramatic reductions of corrosion rates from 700–800 mpy to 30–50 mpy are obtained by the practice of this invention, the combination of water soluble co-polymers and corrosion inhibitors.

TABLE II

| Inhibitor Type | Inhibitor Dosage ppm | Acrylamide/ Acrylic Acid Co-polymer[1] Dosage ppm | Corrosion Rates (mpy) | | |
|---|---|---|---|---|---|
| | | | Velocity I 8.2 ft/sec | Velocity II 12.0 ft/sec | Velocity III 15.7 ft/sec |
| A | 100 | 150 | 79 | 80 | 86 |
| A | 100 | none | 346 | 583 | 660 |

TABLE II-continued

| Inhibitor Type | Inhibitor Dosage ppm | Acrylamide/ Acrylic Acid Co-polymer[1] Dosage ppm | Corrosion Rates (mpy) | | |
|---|---|---|---|---|---|
| | | | Velocity I 8.2 ft/sec | Velocity II 12.0 ft/sec | Velocity III 15.7 ft/sec |
| B | 170 | 170 | 52 | 57 | 45 |
| B | 100 | none | 413 | 458 | 526 |
| C | 50 | 150 | 48 | 36 | 45 |
| C | 50 | none | 64 | 95 | 197 |
| none | none | none | 735 | 867 | 784 |
| none | none | none | 925 | 963 | 959 |
| none | none | 150 | 236 | 265 | 249 |

[1]70/30 mole weight ratio
A = carboxylic acid salts of polyamidoamines
B = mixture of Alkyl Pyridine benzyl chloride quaternary salt and imidazoline quaternary salt
C = acrylic acid adduct of imidazoline

Example 3

The water-soluble cationic dispersion polymers were tested in the presence of a corrosion inhibitor using the flow loop system described above, with results as reported in Table III.

Row four illustrates a blank experiment in which neither corrosion inhibitor nor water soluble polymer were added, to establish initial rates of corrosion. Those values were in the range of 900–1100 mpy. For comparison purposes, corrosion reduction by the corrosion inhibitor in the absence of friction flow reducing water soluble co-polymer is listed in row three. Row two shows that cationic dispersion polymer A in combination with the corrosion inhibitor increases the corrosion reduction over corrosion inhibitor alone. Thus, this polymer demonstrates the synergy of friction flow reducers and corrosion inhibitors.

TABLE III

| Polymer | Polymer Dosage ppm | Inhibitor | Inhibitor Dosage ppm | Corrosion Rates (mpy) | | |
|---|---|---|---|---|---|---|
| | | | | 8.2 ft/sec | 12 ft/sec | 15.7 ft/sec |
| A | 150 ppm | B | 100 ppm | 202 | 214 | 231 |
| C | 150 ppm | B | 100 ppm | 644 | 681 | 676 |
| None | 0 ppm | B | 100 ppm | 413 | 458 | 526 |
| None | 0 ppm | None | 0 ppm | 964 | 1035 | 1098 |

A = cationic dispersion polymer, 54% dimethylaminoethyl methacrylate (sulfuric acid salt) and 46% acrylamide
B = mixture of Alkyl Pyridine benzyl chloride quaternary salt and imidazoline quaternary salt
C = cationic dispersion polymer, 65% acrylamide, 25% dimethylaminoethyl acrylate benzyl chloride quaternary, 10% dimethylaminoethyl acrylate methyl chloride quaternary

We claim:

1. A method for preventing corrosion of the metallic surfaces of a horizontal pipeline in contact with an oil-in-brine emulsion of a crude oil being transported under turbulent flow conditions which produce friction comprising continuously adding to the oil-in brine emulsion flowing through the pipeline A. an effective turbulence-reducing amount of a water-soluble polymer having an average molecular weight greater than one million and B. an effective corrosion-inhibiting amount of a nitrogen-containing corrosion inhibitor selected from the group consisting of:

quaternary ammonium salts of the following structure:

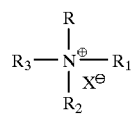

where R, $R_1$, $R_2$ and $R_3$ are moieties containing one to twenty-two carbon atoms selected from the group consisting of alkyl, aryl and alkylaryl groups and X is an anion selected from the group consisting of chlorine, bromine and iodine;

alkyl-substituted nitrogen-containing heterocyclics of the following structure:

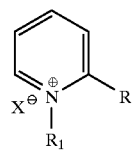

where R is an alkyl moiety containing one to twenty-two carbon atoms and $R_1$ is a moiety containing one to twenty-two carbon atoms selected from the group consisting of alkyl and alkylaryl and X is an anion selected from the group consisting of chlorine, bromine and iodine;

amides of the following structure:

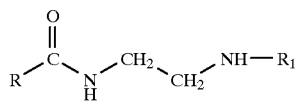

wherein R is a moiety containing eight to twenty carbon atoms selected from the group consisting of saturated and unsaturated alkyls and $R_1$ is an alkyl polyamine carboxylic acid salt moiety having one to twenty carbon atoms;

and imidazolines of the following structure:

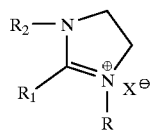

wherein R is a moiety selected from the group consisting of benzyl, methyl and carboxylic acid salts, $R_1$ is an alkyl moiety containing one to twenty-two carbon atoms and $R_2$ is selected from the group consisting of alkyl polyamines having one to twenty-two carbon atoms, hydrogen and alcohols having one to twenty carbon atoms and X is an anion selected from the group consisting of chlorine, bromine, iodine and methyl sulfate.

2. The method of claim 1 wherein the water-soluble polymer is selected from the group consisting of polyacrylamide and co-polymers of acrylamide and acrylic acid having from 5–95 % by weight acrylamide, said polymer having an average molecular weight greater than five million.

3. The method of claim 2 wherein from 25 to 2500 ppm of the polymer is added to the oil-in brine-emulsion.

4. The method of claim 2 wherein from 50–1000 ppm of the polymer is added to the oil-in-brine emulsion.

5. The method of claim 2 wherein from 100–300 ppm of the water soluble polymer is added to the oil-in-brine emulsion.

* * * * *